US010608450B2

(12) United States Patent
Shayesteh-Pour et al.

(10) Patent No.: US 10,608,450 B2
(45) Date of Patent: Mar. 31, 2020

(54) POWER POLARITY DETECTION FOR ACCESSORY MODE CHANGE

(71) Applicant: Microsoft Technology Licensing, LLC, Redmond, WA (US)

(72) Inventors: Hamid-reza Shayesteh-Pour, Woodinville, WA (US); Arto Ylikoski, Redmond, WA (US); Jason Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 15/986,637

(22) Filed: May 22, 2018

(65) Prior Publication Data

US 2019/0363554 A1 Nov. 28, 2019

(51) Int. Cl.
*H01M 10/44* (2006.01)
*H01M 10/46* (2006.01)
*H02J 7/00* (2006.01)
*H02J 7/02* (2016.01)
*H04R 1/10* (2006.01)

(52) U.S. Cl.
CPC ............ *H02J 7/0044* (2013.01); *H02J 7/025* (2013.01); *H04R 1/1025* (2013.01)

(58) Field of Classification Search
CPC . H02J 2007/0096; H02J 7/0045; H02J 7/0034
USPC ......................................... 320/107, 111, 165
See application file for complete search history.

(56) References Cited

U.S. PATENT DOCUMENTS 6,181,588 B1  1/2001 Kates et al.
6,759,833 B1 * 7/2004 Chen .................... H01M 2/342
                                                           320/105
9,148,717 B2  9/2015 Shaffer
9,525,303 B2  12/2016 Jing et al.
9,532,128 B2  12/2016 Linden et al.
9,769,558 B2   9/2017 Chandramohan et al.
(Continued)

FOREIGN PATENT DOCUMENTS

CN        202997644 U   6/2013
EP          3154275 A1  4/2017

OTHER PUBLICATIONS

Purcher, Jack, "Apples Patent Covering their Wireless Charging AirPods Case for AirPower Surfaces as Launch Time Nears", Retrieved From http://www.patentlyapple.com/patently-apple/2018/03/apples-patent-covering-their-wireless-charging-airpods-case-for-airpower-surfaces-as-launch-time-nears.html, Mar. 8, 2018, 12 Pages.
(Continued)

*Primary Examiner* — Edward Tso
(74) *Attorney, Agent, or Firm* — Holzer Patel Drennan (57) ABSTRACT

A portable electronic accessory is adapted to initiate an operational mode change in a portable electronic accessory responsive to a user-initiated instruction received along a standard power line. The portable electronic accessory includes a rechargeable battery, electrical leads adapted to couple with a charging source to charge the rechargeable battery, and a polarity detection circuit configured to detect a power polarity switch of the electrical leads when the portable electronic accessory is coupled to the charging source. The portable electronic accessory further includes a controller that initiates a device mode change responsive to the power polarity switch detected by the polarity detection circuit.

20 Claims, 6 Drawing Sheets

(56) References Cited

U.S. PATENT DOCUMENTS

| | | | |
|---|---|---|---|
| 2012/0206194 A1* | 8/2012 | Chen | H02J 7/0034 327/543 |
| 2013/0093396 A1* | 4/2013 | Dien | H02J 7/0013 320/118 |
| 2014/0150373 A1* | 6/2014 | Hatzinikolas | E04B 1/4178 52/712 |
| 2016/0226277 A1 | 8/2016 | Wenger et al. | |
| 2017/0134845 A1 | 5/2017 | Milam et al. | |
| 2017/0245040 A1* | 8/2017 | Hankey | H04M 1/05 |
| 2018/0091887 A1 | 3/2018 | Minoo et al. | |

OTHER PUBLICATIONS

"International Search Report and Written Opinion Issued in PCT Application No. PCT/US2019/030983", dated Aug. 29, 2019, 12 Pages.

* cited by examiner

POWER POLARITY DETECTION FOR ACCESSORY MODE CHANGE

BACKGROUND

Portable electronic accessories often include control electronics adapted to receive and respond to at least some user-initiated instructions for device operation. For example, user input is typically provided through physical input mechanism(s), such as buttons, microphones, touch sensors, etc. However, as portable device accessories decrease in size, space constraints create challenges in positioning physical input mechanism(s) in user-accessible locations and relative to other components on increasingly crowded printed circuit boards (PCBs).

SUMMARY

Implementations disclosed herein provide for transmission and device implementation of user-initiated instructions along electrical lines supplying power to a portable electronic accessory. According to one implementation, a portable electronic accessory includes a rechargeable battery and electrical leads adapted to couple with a charging source to charge the rechargeable battery. Further, the portable electronic accessory includes a polarity detection circuit that detects a power polarity switch applied to the electrical leads, and also includes a controller that initiates an operational mode change responsive to the detection of the power polarity switch by the polarity detection circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The herein disclosed technology implements power line polarity switching and polarity switch detection mechanisms to convey a user-initiated instruction to control circuitry within a portable electronic accessory. In one implementation, the disclosed techniques may be implemented in lieu of including a physical input mechanism (e.g., a button) on the portable electronic accessory and/or without utilizing a separate data line to transmit the user-initiated instruction to the control circuitry.

Figure 1:
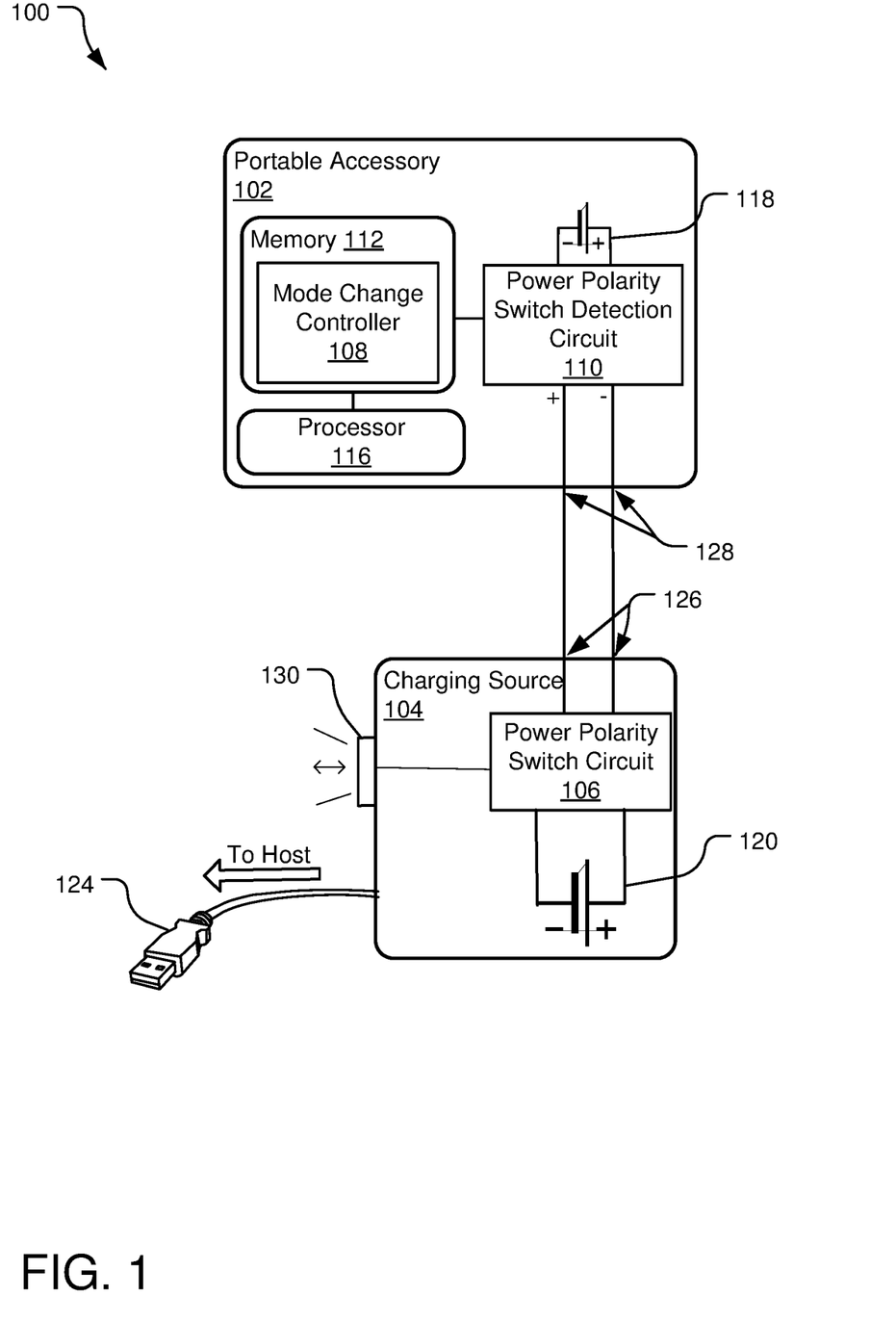
FIG. 1 illustrates an example system that implements circuitry for power polarity line switching and polarity switch detection to initiate an operational mode change in a portable electronic accessory.

FIG. 1 illustrates an example system 100 that implements circuitry for power polarity line switching and polarity switch detection to initiate an operational mode change in a portable accessory 102. The system 100 includes the portable accessory 102 and a charging source 104 which is, in one implementation, a portable charging box. In the illustrated implementation, the charging source 104 has a battery supply 120 that is capable of being recharged by an external power supply (not shown). For example, the battery supply 120 may be recharged when a power connector 124 (e.g., a USB connector, standard electrical plug, or other power coupling type) is coupled to an external power source, such as a host device, wall outlet, etc. In another implementation, the battery supply 120 includes one or more removable batteries, such as removable rechargeable batteries or single-use batteries that are designed to be discarded and replaced once depleted.

The charging source 104 includes an accessory coupling port (not shown) for receiving and coupling with the portable accessory 102. When the portable accessory 102 is coupled with the accessory coupling port of the charging source 104, electrical leads 128 of the portable accessory 102 electrically couple with electrical leads 126 of the charging source 104, facilitating a flow of current between the battery supply 120 of the charging source 104 and a rechargeable battery supply 118 of the portable accessory 102. A capacity of the battery supply 120 is larger than a capacity of the rechargeable battery supply 118 such that the battery supply 120 may fully re-charge the rechargeable battery supply 118 to a maximum capacity at least once and, in some implementations, multiple times, without re-charging or replacing batteries of the battery supply 120 in the charging source 104.

In different implementations, the portable accessory 102 may take on a variety of different forms. In general, the portable accessory 102 includes a processor 116 and memory 112 storing software and/or firmware for executing certain device functions that may vary along with the form and functionality of the portable accessory 102. The portable accessory 102 may be any portable electronic accessory with a rechargeable battery including without limitation a wireless mouse, writing tool (e.g., stylus), watch, listening device (e.g., earbud), other small wearable device (e.g., wearable camera, microphone), etc.

In one implementation, the memory 112 stores instructions executable to initiate a wireless data transfer between the portable accessory 102 and a host device (not shown), such as data communications between the portable accessory 102 and a laptop computer, smart phone, tablet, or other host device with data processing and data transmission capability. For example, the portable accessory 102 may include circuitry for communicating with the host device via a BlueTooth® connection, WiFi network (e.g., via communications with a local wireless router), or other wireless communication protocol.

In FIG. 1, the memory 112 stores a mode change controller 108 for driving certain mode changes of the portable accessory 102. The mode change controller 108 is coupled to a power polarity switch detection circuit 110 that detects polarity changes at the electrical leads 128. In one implementation, the mode change controller 108 is programmed to initiate a device mode change responsive to detection of a switch in the polarity of the electrical leads 128 while the portable accessory 102 is coupled to the charging source 104 and drawing current from the battery supply 120. As used herein, "mode change" refers to an operational mode change that is affected at least in part via execution of software. For example, the power polarity switch detection circuit 110 may detect a switch in the direction of incoming current flow, and the mode change controller 108 executes certain instructions to alter an operational mode of the device (e.g., a communication mode, a power mode) responsive to such detection.

The charging source 104 includes a power polarity switch circuit 106 that is designed to selectively switch the polarity of the electrical leads 126 in the charging source 104 responsive to receipt of user input detected at an input mechanism 130. The input mechanism 130 may take on a variety of forms in different implementations but is, in one implementation, a mechanism that is capable of being physically engaged by touch input. For example, the input mechanism 130 may include a button, switch, toggle, touch sensor, etc. In one implementation, the input mechanism 130 is configured to accept one or more types of user input in addition to or in lieu of touch input, such as voice or camera inputs.

By design, a user may selectively engage the input mechanism 130 to initiate a mode change of the portable accessory. Responsive to detection of such user engagement with the input mechanism 130, the power polarity switch circuit 106 reverses the positive/negative polarity of the electrical leads 126 which, in turn, reverses the polarity detected by the power polarity switch detection circuit 110 at the electrical leads 128 of the portable accessory 102. The mode change controller 108 detects this polarity reversal and, in response, initiates an operational mode change that is associated in memory with the type of user input received via the input mechanism 130. In one example implementation, the mode change places the portable accessory 102 into a Bluetooth pairing mode to pair the portable accessory 102 with a host device as part of a set-up sequence establishing bidirectional communications. In another example implementation, the mode change alters a power state of the portable accessory 102, such as to transition the portable accessory 102 out of or into a low-power state (e.g., a sleep mode). In still other implementations, the mode change effects other changes to device functionality.

By using the power polarity switch circuit 106 and power polarity switch detection circuit 110 to convey detected user input between the input mechanism 130 and the mode change controller 108 in the above-described manner, the portable accessory 102 can be free of physical input mechanisms (e.g., no buttons on the portable accessory 102) while still providing some user control over device mode changes without integrating additional data lines or processing components that increase complexity, production costs, or power demand.

Figure 2:
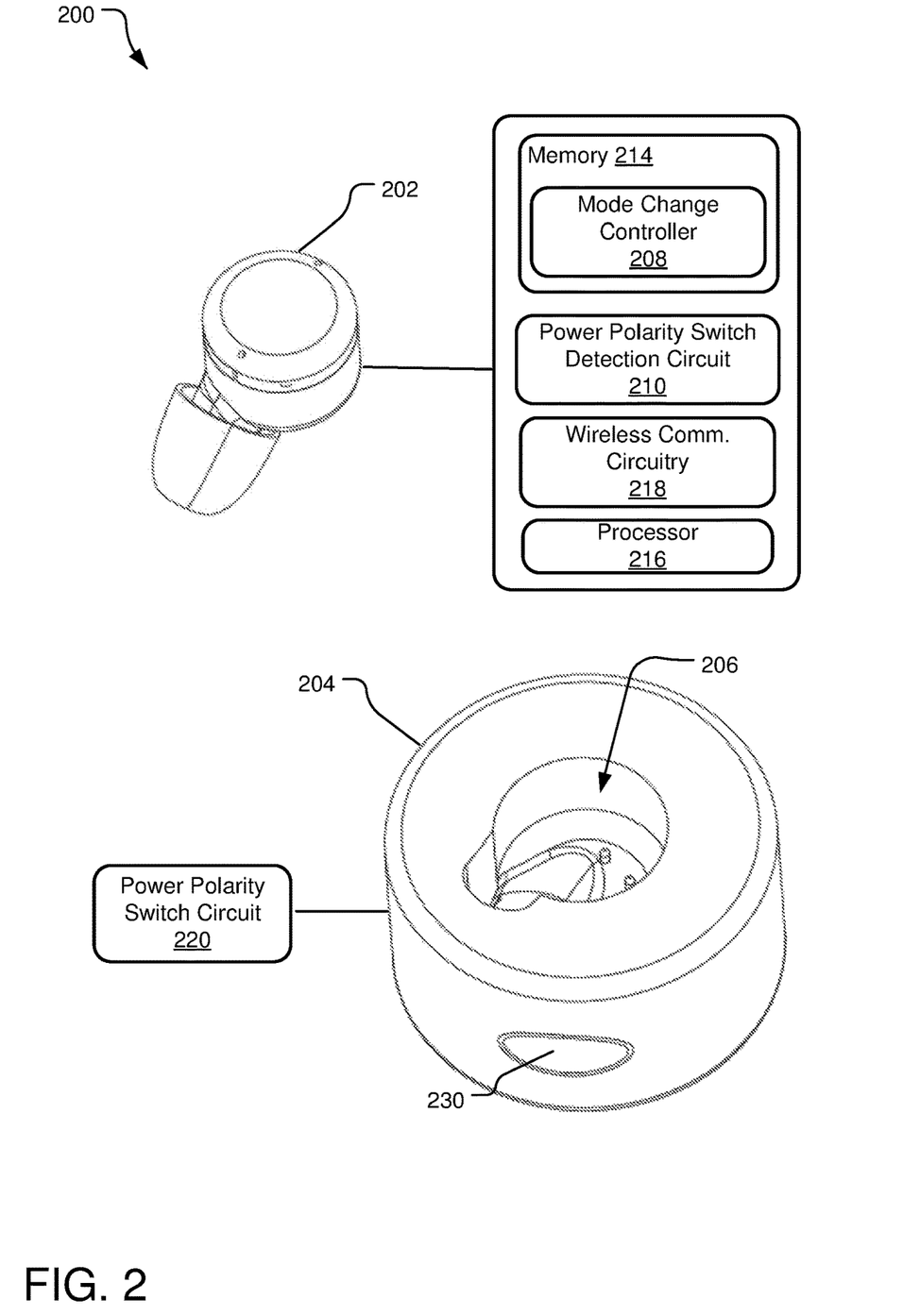
FIG. 2 illustrates another example system that implements circuitry for power line polarity switching and polarity switch detection to initiate operational mode changes of a portable electronic accessory.

FIG. 2 illustrates another example system 200 that implements circuitry for power line polarity switching and polarity switch detection to initiate operational mode changes of a portable electronic accessory 202. In the illustrated implementation, the portable electronic accessory 202 is an earbud with a battery (not shown) that is recharged when the earbud is coupled to an accessory coupling port 206 of a charging source 204 (e.g., an earbud case).

When the portable electronic accessory 202 is coupled with the accessory coupling port 206 of the charging source 204, electrical leads (not shown) of the portable electronic accessory 202 coupled with electrical leads (not shown) of the charging source 204, allow current to flow from a battery of the charging source 204 to the battery within the portable electronic accessory 202 (also referred to herein as "the accessory battery"). In one implementation, the charging source 204 includes a rechargeable power supply (not shown). For example, the charging source 204 may include one or more batteries that may be recharged when the charging source 204 is coupled to an external power source such as a host device, electrical outlet, battery pack, etc.

The portable electronic accessory 202 includes a combination of hardware and software including a processor 216, memory 214 storing instructions executable by the processor 216, a power polarity switch detection circuit 210, and a wireless communication circuitry 218. In general, the power polarity switch detection circuit 210 detects polarity changes at the electrical leads of the portable electronic accessory 202 while the portable electronic accessory 202 is coupled to the accessory coupling port 206 of the charging source 204. The wireless communication circuitry 218 facilitates communications with an external host device (not shown) using a wireless communication protocol, such as Bluetooth or WiFi.

In addition to those components described above, the portable electronic accessory 202 also includes a mode change controller 208 stored in the memory 214 that is executable to drive certain operational mode changes of the portable electronic accessory 202 based on inputs from the power polarity switch detection circuit 210 and/or the wireless communication circuitry 218. In some implementations, the mode change controller 208 executes mode changes utilizing the wireless communication circuitry 218. For example, the mode change controller 208 may transition the portable electronic accessory 202 into a Bluetooth pairing mode by controlling the wireless communication circuitry 218 to setup a bidirectional communication link with an external host. In another implementation, the mode change controller 208 controls power mode changes and/or modes that utilize certain device sensors (e.g., video or data capture modes in some accessories), some of which may entail data communications utilizing the wireless communication circuitry 218.

The mode change controller 208 receives input from the power polarity switch detection circuit 210 and initiates a mode change responsive to a detected reversal in the polarity of electrical leads that are used to flow current to the accessory battery (also referred to herein as "charging leads"). In one implementation, the mode change controller 208 initiates a Bluetooth pairing mode of the portable electronic accessory 202 responsive to a detected reversal in polarity of the charging leads of the portable electronic accessory 202.

In FIG. 2, polarity of the charging leads may be selectively reversed by a power polarity switch circuit 220 integrated within the charging source 204. The power polarity switch circuit 220 is designed to swap the positive/negative polarity of the electrical leads supplying power to the rechargeable battery of the portable electronic accessory 202 responsive to detected user engagement with an input mechanism 230 (e.g., a button or other touch sensor). For example, a user may selectively engage the input mechanism 230 to initiate a mode change of the portable electronic accessory 202. For example, the mode change may place the portable electronic accessory 202 into a Bluetooth pairing mode, alter a device power state, etc.

Responsive to detected user engagement with the input mechanism 230, the power polarity switch circuit 220 reverses the positive/negative polarity of the electrical leads in the charging source 204 that are designed to couple to the electrical leads in the portable electronic accessory 202. Provided the portable electronic accessory 202 is properly coupled to the charging source 204, the mode change controller 208 detects this polarity reversal and initiates the operational mode change in response to such detection. By conveying user input received at the input mechanism 230 to the mode change controller 208 in the above-described manner, the portable electronic accessory 202 can be made smaller—without any physical user input mechanisms—and without a trade-off in device functionality and/or without limiting a user's capability to control such functionality. Further, this design also facilitates the conveyance of a user's instruction to the portable electronic accessory 202 in a manner that does not rely on a separate physical data line for transmission of the instruction. Rather, the user instruction is transmitted along the same power lines that are also used to charge the battery of the portable electronic accessory 202. As a result, the portable electronic accessory 202 can be made smaller while simultaneously simplifying both manufacturing complexity and production costs.

Figure 3:
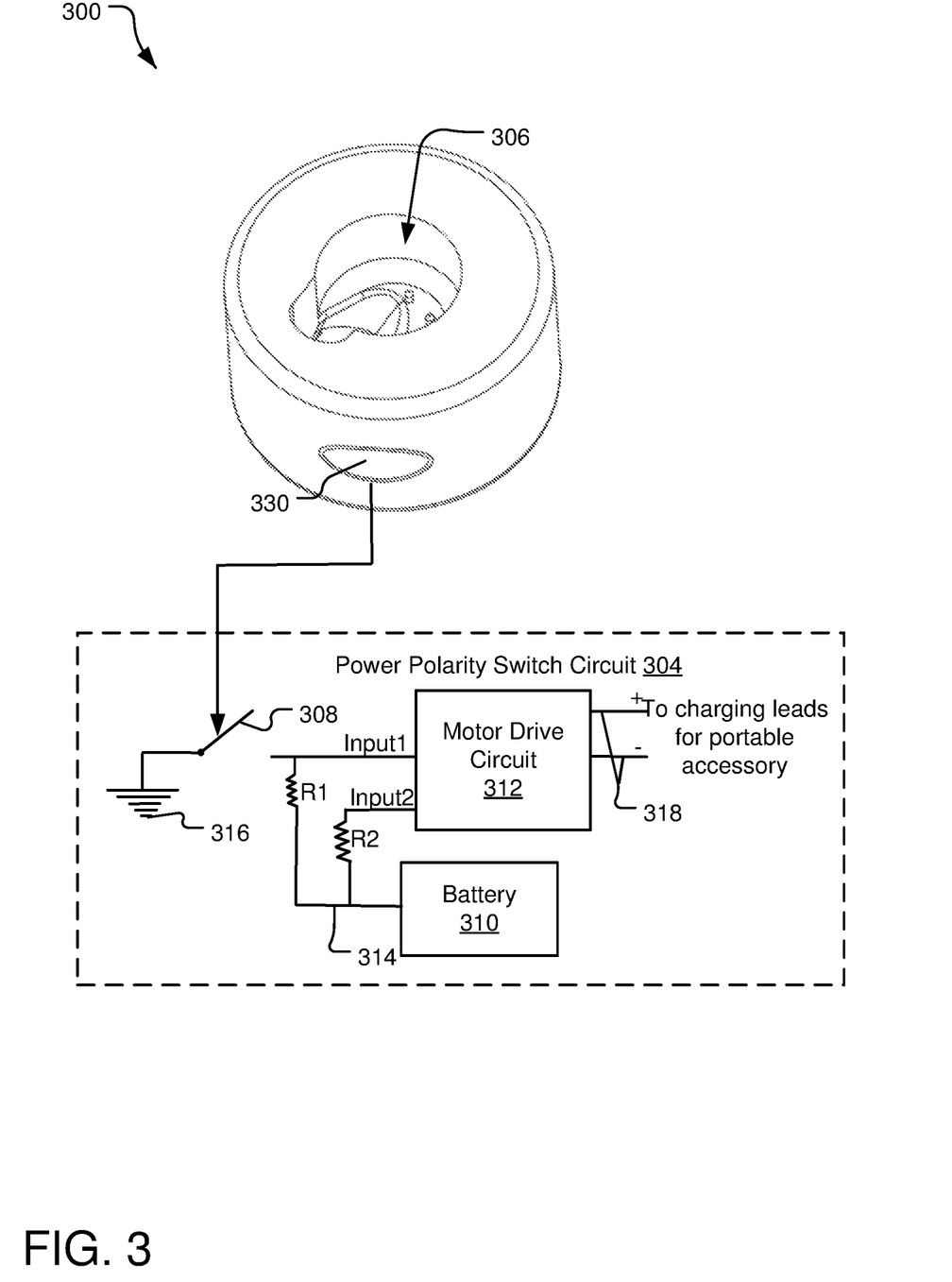
FIG. 3 illustrates a portable charging case including an example power polarity switch circuit that may be utilized to transmit a user-initiated operational mode change instruction to a portable accessory.

FIG. 3 illustrates a portable charging case 300 including an example power polarity switch circuit 304 that may be utilized to transmit a user-initiated operational mode change instruction to a portable accessory. In different implementations, the portable charging case 300 may assume a variety of different forms based on the nature of the portable accessor(ies) and corresponding rechargeable batteries that the portable charging case 300 is designed to recharge.

The portable charging case 300 includes an accessory coupling port 306 sized and shaped to couple to a corresponding portable accessory (not shown). When the portable accessory is placed within the accessory coupling port 306, a power coupling is established between charging leads of the portable charging case 300 and charging leads of the portable accessory, facilitating a flow of current from the portable charging case 300 to a rechargeable battery within the portable accessory.

The portable charging case 300 includes a user input mechanism 330 (e.g., a touch input mechanism, such as a button, touch sensor, toggle, or switch) that may be selectively engaged by a user to initiate a mode change of the portable accessory. When a user provides input to the user input mechanism 330, the power polarity switch circuit 304 reverses the polarity of the charging leads of the portable charging case 300 within the accessory coupling port 306.

The power polarity switch circuit 304 of FIG. 3 represents one of many possible circuit designs that may be suitable to implement above-described polarity-switching functionality. In this design, a battery 310 feeds a rail 314 that couples to two different paths supplying inputs (Input1 and Input2) to a motor drive circuit 312. A resistance R1 in a first current path is less than a resistance R2 in a second current path. As a result, the current flow at Input1 is greater than Input2 when a switch 308 is open, as shown.

When the user presses the input mechanism 330, the switch 308 is closed, causing current flowing across the first current path to route to an electrical ground 316 rather than the first input (Input1) to the motor drive circuit 312. In this case, Input1 becomes less than Input2, effectively switching the high/low inputs by causing the high input to become low and the low input to become high. The motor drive circuit 312 is, in this example, a circuit designed to drive a DC motor and to reverse the rotation direction of a DC motor shaft by switching polarity of output lines 318. If the motor drive circuit 312 were coupled to a DC motor, closing of the switch 308 may have the effect of reversing the rotational direction of the motor's rotating shaft. In the illustrated case, however, the output lines 318 couple to the charging leads that flow current to charge the battery 310 of the portable accessory. Closing of the switch 308 has the effect of reversing the polarity of these charging leads.

Figure 4:
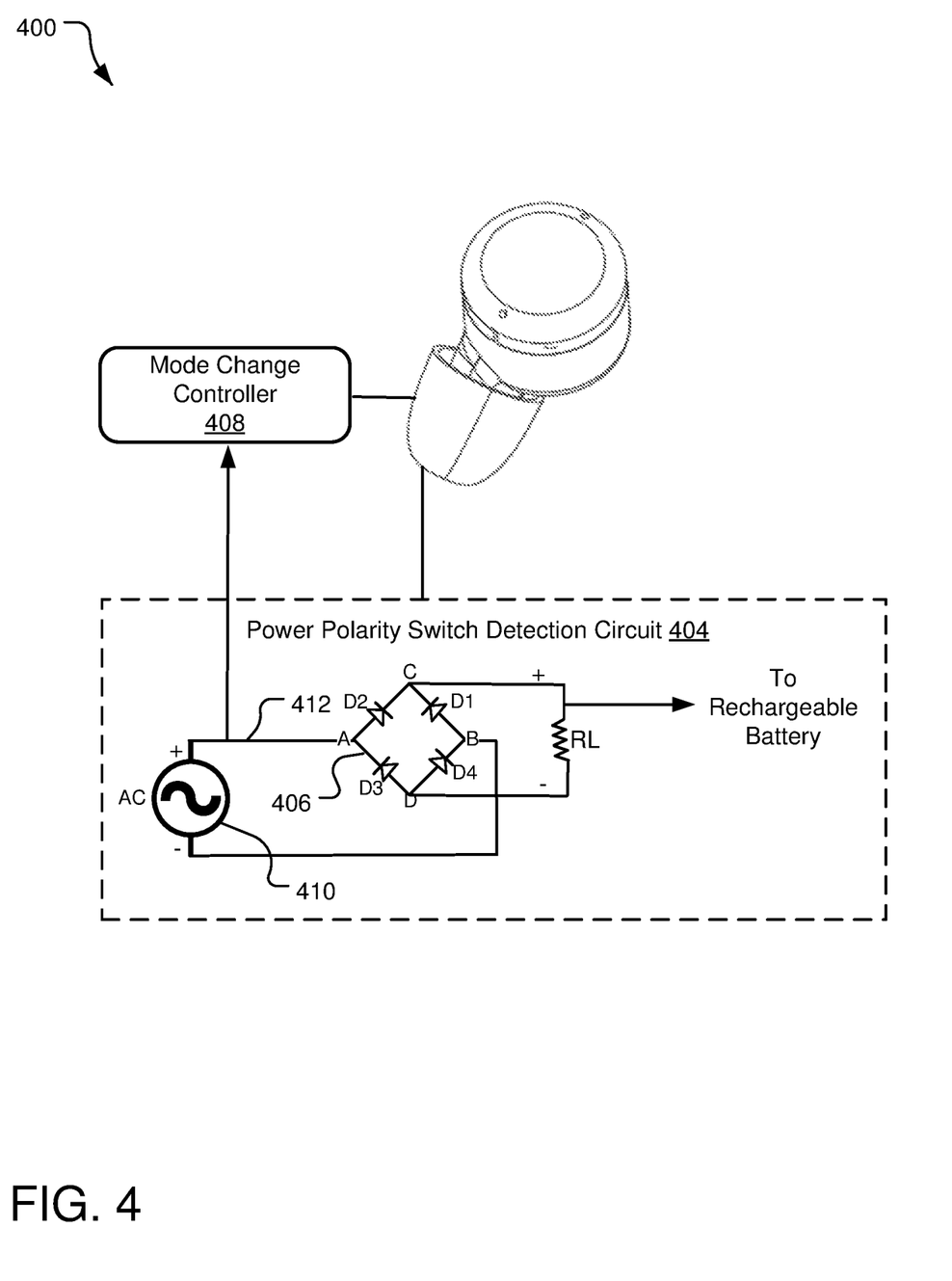
FIG. 4 illustrates an example portable accessory with circuitry for implementing device mode changes in response to changes in polarity applied to charging leads of a portable accessory.

FIG. 4 illustrates an example portable accessory 400 with circuitry for implementing device mode changes in response to detected changes in polarity at charging leads of a portable accessory 400. In one implementation, the portable accessory 400 is designed to couple with a charging case (not shown) including features the same or similar to those shown and described with respect to FIG. 3.

The portable accessory 400 includes at least a mode change controller 408 that receives inputs from a power polarity switch detection circuit 404 and selectively initiates operational mode changes based on such inputs. In the illustrated implementation, the power polarity switch detection circuit 404 includes a rectifier bridge 406 that intercepts current flowing between the charging case and a rechargeable battery (not shown) of the portable accessory 400. Traditionally, a rectifier bridge is used to convert an input AC signal to a DC signal. In the present case, the charging case provides current to the portable accessory 400 that behaves like a very low frequency AC signal (represented by an AC current source 410), and the rectifier bridge 406 converts this low frequency AC signal to a DC output.

The signal received as input to the power polarity switch detection circuit 404 exhibits periodic current switching due to periodic reversals in polarity applied to charging leads of the portable accessory 400. For example, a current switch is observed each time a user physically engages a button (e.g., the input mechanism 320 in FIG. 3) on a charging case coupled to the portable accessory 400. The rectifier bridge 406 includes four diodes connected in a closed loop with a load resistor (RL). The input signal represented by the AC current source 410 is applied across two opposing terminals (A and B), and the output DC signal is obtained across the load resistor (RL), which is connected between the other two opposing terminals (C and D). The four diodes (D1, D2, D3, and D4) are arranged in series with two diodes allowing electric current to pass through during each portion of the cycle. When the received current flows a first direction, D1 and D3 are forward-biased, allowing current to pass, while the diodes D2 and D4 are reverse-biased, blocking current. When the received current flows in a second direction, the diodes D2 and D4 are forward-biased, allowing current to pass, while the diodes D1 and D3 are reverse-biased, blocking current. The output DC signal obtained across the load resistor (RL) is provided to the rechargeable battery of the portable accessory 400.

The mode change controller 408 samples current flowing along a line 412 from the AC current source 410 in order to detect the switches in current direction. In this manner, the mode change controller 408 may directly observe reversals in the polarity of electrical leads within the portable accessory 400. In one implementation, the mode change controller 408 initiates software operations to alter a current mode of the portable accessory 400 each time current flow along the line 412 switches from positive to negative or vice versa. For example, the mode change controller 408 initiates a Bluetooth pairing mode of the portable electronic accessory 400 responsive to a detected reversal in the direction of current flow along the line 412.

Notably, the power polarity switch detection circuit 404 represents just one of multiple possible electrical designs that may be suitable for detecting changes in polarity applied to charging leads of a portable accessory.

Figure 5:
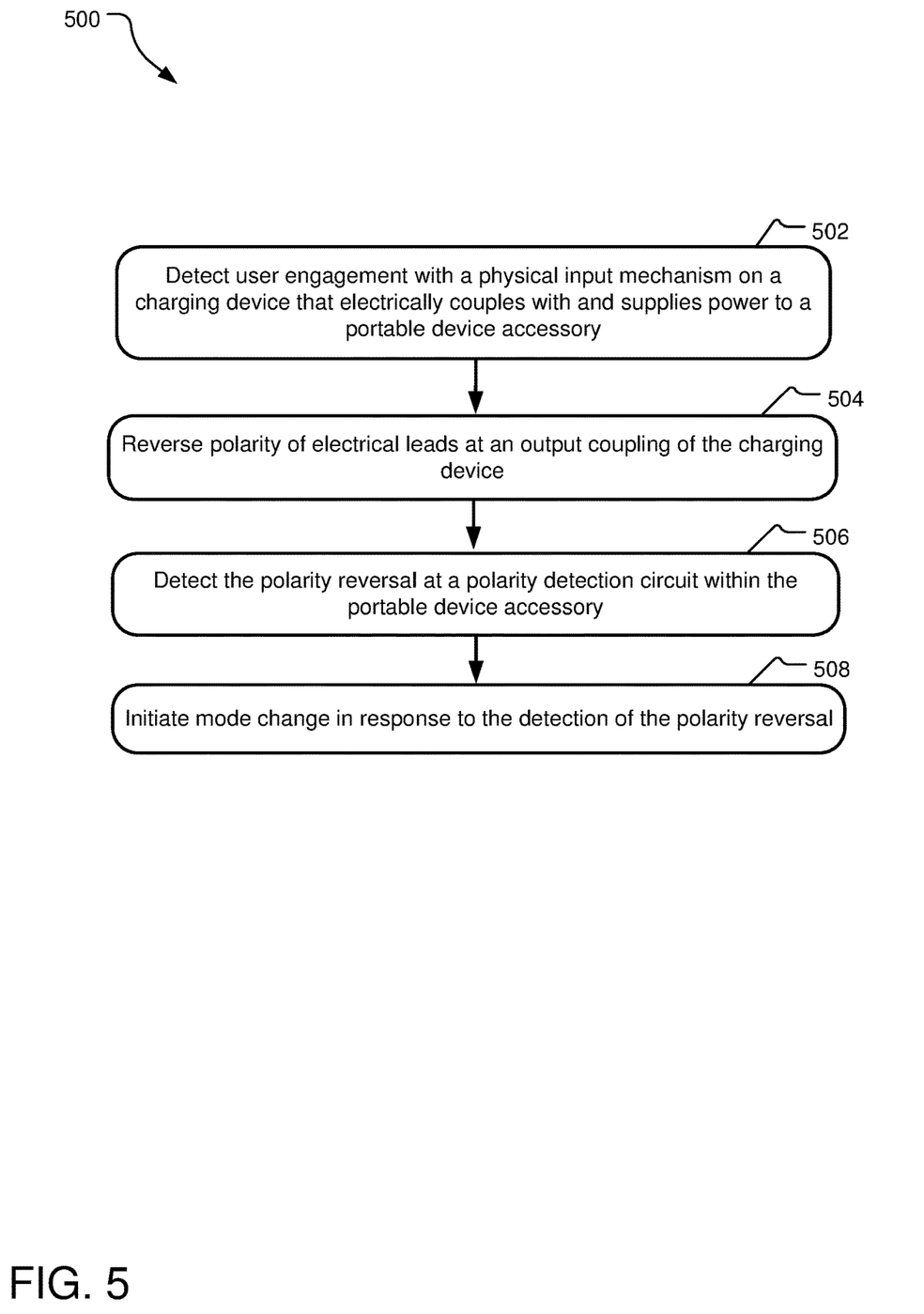
FIG. 5 illustrates example operations for using power polarity line switching and polarity switch detection to initiate device mode changes.

FIG. 5 illustrates example operations 500 for using power polarity line switching and polarity switch detection to initiate device operational mode changes. A detection operation 502 detects user engagement with a physical input mechanism on a charging device (e.g., a portable charging case) that electrically couples with and supplies power to a portable electronic accessory. For example, the physical input mechanism may be a button or switch on a portable charging case (e.g., as shown in FIGS. 1, 2, and 3). Responsive to the detection operation 502, a polarity reversal operation 504 reverses the power polarity of electrical leads of the charging device that are designed to couple with electrical leads of the portable accessory to flow current between the charge device and a battery of the portable accessory. Another detection operation 506 detects the reversal in the power polarity of the electrical leads of the portable accessory and a mode change initiation operation 508 initiates a mode change of the portable accessory responsive to the detection of the reversed polarity.

Figure 6:
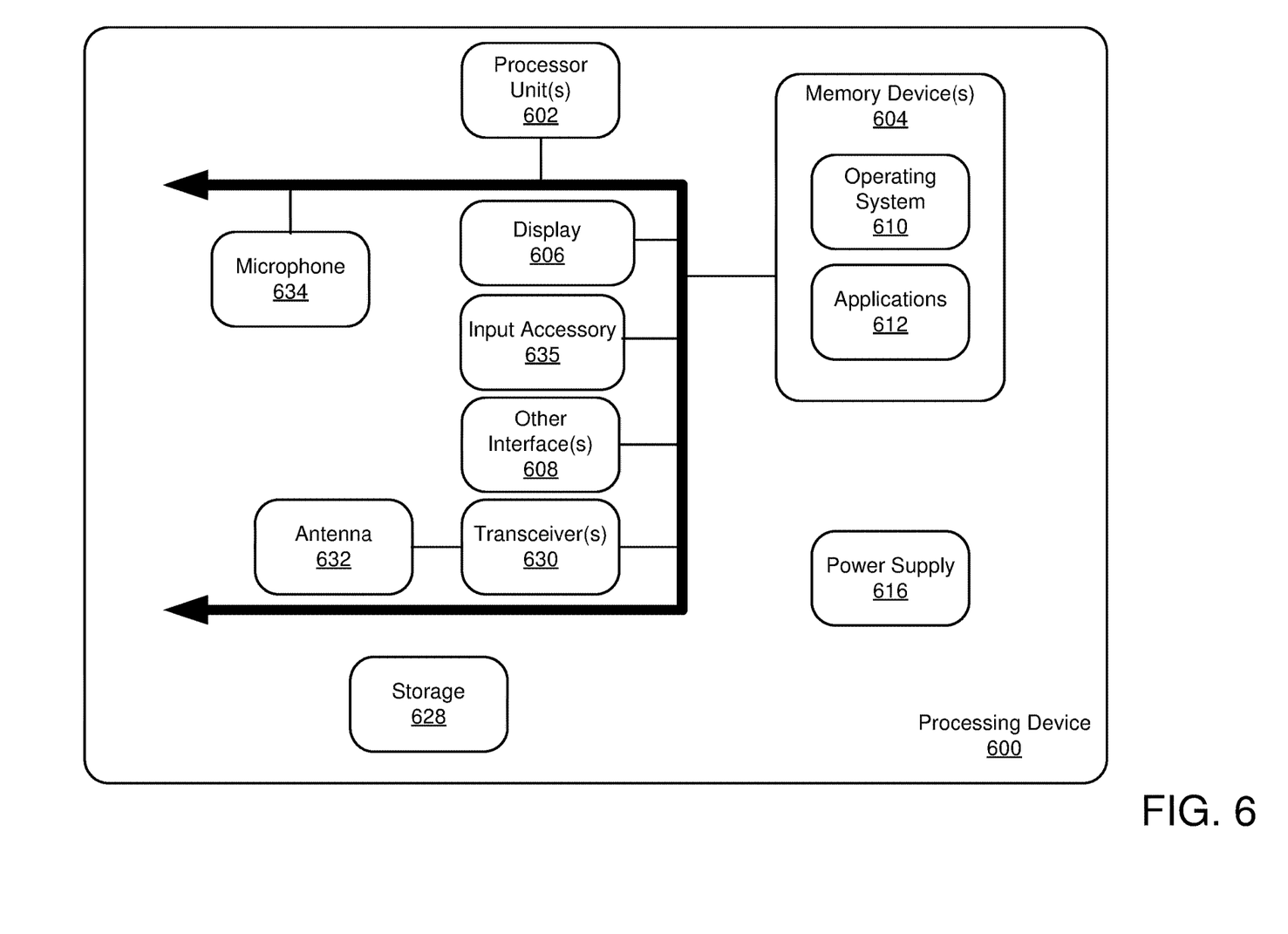
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612, such as a mode change controller or host device program for communicating with a mode change controller, are loaded in the memory 604 and executed on the operating system 610 by the processor unit(s) 602. The applications 612 may receive input from various input devices such as a microphone 634 or input accessory 635 (e.g., keypad, mouse, stylus, touchpad, gamepad, racing wheel, joystick, etc.). The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed.

In an example implementation, a mobile operating system, various applications (e.g., applications for communicating with a portable accessory) and other modules and services may have hardware and/or software embodied by instructions stored in the memory 604 and/or the storage devices 628 and processed by the processor unit(s) 602. The memory 604 may be memory of a host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a portable electronic accessory including a rechargeable battery, electrical leads adapted to couple with a charging source to charge the rechargeable battery, and a power polarity switch detection circuit configured to detect a power polarity switch of the electrical leads when the portable electronic accessory is coupled to the charging source. The system further includes a controller to initiate a mode change responsive to the power polarity switch detected by the power polarity switch detection circuit.

In another example system of any preceding system, the mode change transitions the portable electronic accessory into a Bluetooth pairing mode.

In yet another example system of any preceding system, the mode change alters a power state of the portable electronic accessory.

In still another example system of any preceding system, the system further comprises a charging box including a first set of electrical leads configured to couple with the electrical leads of the portable electronic accessory and a user input mechanism for reversing polarity of the first set of electrical leads in the charging box.

In yet still another example system of any preceding system, the user input mechanism is coupled to a motor drive circuit and the user input mechanism is engageable to close a switch that reroutes an input to the motor drive circuit to an electrical ground.

In still another example system of any preceding system, the power polarity switch detection circuit includes a rectifier bridge and a direction of current flow into the rectifier bridge changes each time the user input mechanism is engaged.

In yet still another example system of any preceding system, the portable electronic accessory includes an earbud and the charging source is a portable charging case.

An example method disclosed herein includes detecting a switch in polarity of electrical leads of a portable electronic accessory, where the electrical leads are configured to flow current between an external charging source and a rechargeable battery of the portable electronic accessory. The method further includes initiating a mode change responsive to the detected polarity switch.

Another example method according to any preceding method further includes receiving user input at a physical input mechanism coupled to a power polarity switching circuit; and reversing polarity of electrical leads at an output coupling of the external charging source responsive to detection of the user input, the output coupling being adapted to electrically couple with the electrical leads of the portable electronic accessory.

In still another example method of any preceding method, the physical input mechanism is coupled to a motor drive circuit and detecting user engagement with the physical input mechanism further comprises detecting a switch in high/low inputs to the motor drive circuit.

In yet still another example method of any preceding method, detecting the switch in the polarity of the electrical leads includes detecting the switch at a power polarity switch detection circuit including a rectifier bridge, wherein a direction of current flow into the rectifier bridge changes each time the physical input mechanism is engaged.

In another example method of any preceding method, initiating the mode change further comprises initiating a Bluetooth pairing mode of the portable electronic accessory.

In another example method of any preceding method, initiating the mode change further comprises altering a power state of the portable electronic accessory.

In still another example method of any preceding method, the portable electronic accessory includes an earbud and the external charging source is a portable charging case.

An example tangible computer-readable storage media encoding computer-executable instructions disclosed herein encodes a computer process comprising detecting a polarity switch of electrical leads of a portable electronic accessory; and initiating a mode change responsive to the detected polarity switch. The electrical leads are configured to flow current between an external charging source and a rechargeable battery of the portable electronic accessory.

In another example computer process of any preceding computer process, the computer process further comprises receiving user input at a physical input mechanism coupled to a power polarity switching circuit and reversing polarity of electrical leads at an output coupling of the external charging source responsive to detection of the user input. The output coupling is adapted to electrically couple with the electrical leads of the portable electronic accessory.

In still another example computer process of any preceding computer process, initiating the mode change further comprises initiating a Bluetooth pairing mode of the portable electronic accessory.

In yet another example computer process of any preceding computer process, initiating the mode change further comprises altering a power state of the portable electronic accessory.

In still another example computer process of any preceding computer process, the physical input mechanism is coupled to a motor drive circuit and detecting user engagement with the physical input mechanism further comprises detecting a switch in high/low inputs to the motor drive circuit.

In another example computer process of any preceding computer process, detecting the switch in the polarity of the electrical leads includes detecting the switch at a power polarity switch detection circuit including a rectifier bridge, wherein a direction of current flow into the rectifier bridge changes each time the physical input mechanism is engaged.

An example system disclosed herein includes a means for detecting a switch in polarity of electrical leads of a portable electronic accessory, where the electrical leads are configured to flow current between an external charging source and a rechargeable battery of the portable electronic accessory. The system further comprises a means for initiating a mode change responsive to the detected polarity switch.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
   a portable electronic accessory including:
   a rechargeable battery;
   electrical leads adapted to couple with a charging source to charge the rechargeable battery;

a power polarity switch detection circuit configured to detect a power polarity switch of the electrical leads when the portable electronic accessory is coupled to the charging source; and a controller to initiate a mode change responsive to the power polarity switch detected by the power polarity switch detection circuit.

2. The system of claim 1, wherein the mode change transitions the portable electronic accessory into a pairing mode.

3. The system of claim 1, wherein the mode change alters a power state of the portable electronic accessory.

4. The system of claim 1, further comprising:

a charging box including:

a first set of electrical leads configured to couple with the electrical leads of the portable electronic accessory; and a user input mechanism for reversing polarity of the first set of electrical leads in the charging box.

5. The system of claim 4, wherein the user input mechanism is coupled to a motor drive circuit and the user input mechanism is engageable to close a switch that reroutes an input to the motor drive circuit to an electrical ground.

6. The system of claim 4, wherein the power polarity switch detection circuit includes a rectifier bridge, wherein a direction of current flow into the rectifier bridge changes each time the user input mechanism is engaged.

7. The system of claim 1, wherein the portable electronic accessory includes an earbud and the charging source is a portable charging case.

8. A method comprising:

detecting a switch in polarity of electrical leads of a portable electronic accessory, the electrical leads configured to flow current between an external charging source and a rechargeable battery of the portable electronic accessory; and initiating a mode change responsive to the detected polarity switch.

9. The method of claim 8, further comprising:

receiving user input at a physical input mechanism coupled to a power polarity switching circuit; and reversing polarity of electrical leads at an output coupling of the external charging source responsive to detection of the user input, the output coupling being adapted to electrically couple with the electrical leads of the portable electronic accessory.

10. The method of claim 9, wherein the physical input mechanism is coupled to a motor drive circuit and detecting user engagement with the physical input mechanism further comprises detecting a switch in high/low inputs to the motor drive circuit.

11. The method of claim 9, wherein detecting the switch in the polarity of the electrical leads includes detecting the switch at a power polarity switch detection circuit including a rectifier bridge, wherein a direction of current flow into the rectifier bridge changes each time the physical input mechanism is engaged.

12. The method of claim 8, wherein initiating the mode change further comprises:

initiating a pairing mode of the portable electronic accessory.

13. The method of claim 8, wherein initiating the mode change further comprises:

altering a power state of the portable electronic accessory.

14. The method of claim 8, wherein the portable electronic accessory includes an earbud and the external charging source is a portable charging case.

15. One or more tangible computer-readable storage media encoding computer-executable instructions for executing on a computer system a computer process, the computer process comprising:

detecting a polarity switch of electrical leads of a portable electronic accessory, the electrical leads configured to flow current between an external charging source and a rechargeable battery of the portable electronic accessory; and initiating a mode change responsive to the detected polarity switch.

16. The one or more tangible computer-readable storage media of claim 15, further comprising:

receiving user input at a physical input mechanism coupled to a power polarity switching circuit; and reversing polarity of electrical leads at an output coupling of the external charging source responsive to detection of the user input, the output coupling being adapted to electrically couple with the electrical leads of the portable electronic accessory.

17. The one or more tangible computer-readable storage media of claim 15, wherein initiating the mode change further comprises:

initiating a pairing mode of the portable electronic accessory.

18. The one or more tangible computer-readable storage media of claim 15, wherein initiating the mode change further comprises:

altering a power state of the portable electronic accessory.

19. The one or more tangible computer-readable storage media of claim 16, wherein the physical input mechanism is coupled to a motor drive circuit and detecting user engagement with the physical input mechanism further comprises detecting a switch in high/low inputs to the motor drive circuit.

20. The one or more tangible computer-readable storage media of claim 16, wherein detecting the switch in the polarity of the electrical leads includes detecting the switch at a power polarity switch detection circuit including a rectifier bridge, wherein a direction of current flow into the rectifier bridge changes each time the physical input mechanism is engaged.

* * * * *